United States Patent [19]

Ogawa et al.

[11] Patent Number: 4,616,611
[45] Date of Patent: Oct. 14, 1986

[54] PRECOMBUSTION CHAMBER CONSTRUCTION OF INTERNAL COMBUSTION ENGINE

[75] Inventors: Yutaka Ogawa; Takayuki Ogasawara; Shigeru Hanzawa, all of Nagoya, Japan

[73] Assignees: NGK Insulators, Ltd.; Mazda Motor Corporation, both of Japan

[21] Appl. No.: 786,487

[22] Filed: Oct. 11, 1985

[30] Foreign Application Priority Data

Oct. 16, 1984 [JP] Japan ............................ 59-155014[U]
Aug. 27, 1985 [JP] Japan ............................ 60-129466[U]

[51] Int. Cl.⁴ ............................................. B41F 13/54
[52] U.S. Cl. ..................................... 123/270; 123/271
[58] Field of Search ............... 123/270, 271, 293, 286, 123/281, 282, 283, 284

[56] References Cited

U.S. PATENT DOCUMENTS 4,325,334  4/1982  Nishida et al. ..................... 123/270
4,511,612  4/1985  Hüther et al. ..................... 123/270

FOREIGN PATENT DOCUMENTS 2448405  4/1975  Fed. Rep. of Germany ...... 123/270
0064116  5/1980  Japan ................................ 123/270
0046317  3/1984  Japan ................................ 123/270
0058119  4/1984  Japan ................................ 123/270

Primary Examiner—Raymond A. Nelli
Attorney, Agent, or Firm—Parkhurst & Oliff

[57] ABSTRACT

A precombustion chamber construction of an internal combustion engine includes an upper ceramic body, a lower ceramic body abutting against the upper ceramic body to form a precombustion chamber communicating through an injection hole with a main combustion chamber of the internal combustion engine, and a metal ring member fitted on outer circumferences of the upper and lower ceramic bodies. According to the invention, the precombustion chamber construction comprises a first key member provided in the upper ceramic body and the metal ring member in the proximity of its upper end, and a second key member provided in the lower ceramic body and the metal ring member in the proximity of its lower end. In this manner, the upper and lower ceramic bodies are prevented from being rotatively moved even if they are subjected to rotating forces caused by vibrations of the engine or explosions of a fuel. The precombustion chamber construction is easy to handle and superior in gas sealing because an air layer is easily formed between the metal ring member and a cavity of a cylinder head for accommodating the precombustion chamber construction.

5 Claims, 8 Drawing Figures

PRECOMBUSTION CHAMBER CONSTRUCTION OF INTERNAL COMBUSTION ENGINE

BACKGROUND OF THE INVENTION

This invention relates to a precombustion chamber construction of an internal combustion engine and more particularly to a precombustion chamber made of a ceramic material to improve thermal efficiency of an engine and durability and heat-resistance of the precombustion chamber and having a metal ring fitted on ceramic members forming the precombustion chamber to facilitate handling the precombustion chamber.

In order to improve thermal efficiency of engines, characteristics of exhaust gases and durability of precombustion chambers of internal combustion engines, particularly diesel engines, various attempts have been made to form part or all of turbulence chambers of internal combustion engines by ceramic materials utilizing their superior charcteristics such as heat-resistance and thermal insulating capability.

However, as the ceramic materials have thermal expansion coefficients smaller than those of materials for constituting cylinder heads, for example, cast irons or aluminum alloys, supporting forces of the cylinder heads for the precombustion chambers tend to decrease when the cylinder heads are at high temperatures. With a precombustion chamber construction of a ceramic material consisting of upper and lower members, particularly, there is a tendency of the members to be rotatively moved relative to each other, so that an injection hole for communicating a main chamber and the precombustion chamber becomes out of its proper position to disturb normal ignition and explosion of a fuel. Moreover, when the upper and lower members are rotated relative to each other to an extreme extent, a fuel injection nozzle and a glow-plug may be often damaged by the movement.

In Japanese Laid-open Utility Model Application NO. 58-191,330 to avoid this, as shown in FIG. 1, a precombustion chamber construction of an internal combustion engine consists of a lower chamber 3a and an upper chamber 3b made of a ceramic material and having pin receiving apertures 7 and 15 formed in the respective lower and upper chambers. Moreover, a cylinder head 1 is formed with a pin engaging recess 16 straight extending along an inner surface of a cavity of the cylinder head from its lower surface to the ceramic upper chamber 3b. With this precombustion chamber construction, the pins 9 are inserted in the pin receiving apertures 7 and 15, so that depression engaging portions 9b of the pins 9 engage within the pin engaging recess 16 so as to be press-fitted therein with an interference, thereby fixing the ceramic chamber 3 to the metal cylinder head 1.

With this arrangement, however, clearances occur between the ceramic members and the metal members during the operation of the engine due to large differences in thermal expansion coefficient between the ceramic material and the metals, so that parts of explosion energy caused by ignition and explosion of a fuel injected into air which has been at high temperature and high pressure by rapid compression would escape into the pin engaging recess to lower the output of the engine.

In assembling the precombustion chamber construction, moreover, the upper and lower chambers made of the ceramic material having the pins extending from the chambers, respectively, must be inserted separately into the precombustion receiving cavity formed in a lower side of the cylinder head. Accordingly, the assembling operation of the precombustion chamber construction is very troublesome because it is required to take care not to damage the ceramic members which are of high strength but brittle.

SUMMARY OF THE INVENTION

It is a primary object of the invention to provide a precombustion chamber of an internal combustion engine, which eliminates all the disadvantages of the prior art and is easy to handle and superior in gas sealing and whose upper and lower ceramic bodies constituting the precombustion chamber do not rotate relative to each other during the operation of the engine.

In order to achieve this object, in a precombustion chamber construction of an internal combustion engine, including an upper ceramic body, a lower ceramic body abutting against the upper ceramic body to form a precombustion chamber communicating through an injection hole with a main combustion chamber of the internal combustion engine, and a metal ring member fitted on outer circumferences of said upper and lower ceramic bodies, the precombustion chamber construction according to the invention comprises a first key member whose part is received in a cut-away portion formed in said outer circumference of said upper ceramic body in the proximity of an upper end of said metal ring member and whose remaining part is received in a groove formed in an inner circumference of the upper end of the metal ring member corresponding to said cut-away portion of the upper ceramic body, and a second key member whose part is received in a cut-away portion formed in the outer circumference of the lower ceramic body in the proximity of a lower end of the metal ring member and whose remaining part is received in a groove formed in an inner circumference of the lower end of the metal ring member corresponding to the cut-away portion of the lower ceramic body.

In a preferred embodiment of the invention, the outer circumferences of the upper and lower ceramic bodies are cut-off in a form of a half-moon which is less than a semicircle and has a straight chord to form the cut-away portions formed in the upper and lower ceramic bodies.

The cut-away portions formed in the upper and lower ceramic bodies may be channel-shaped grooves.

According to the invention, the precombustion chamber construction may further comprise a third key member received in cut-away portions formed in the upper and lower ceramic bodies at their abutting surfaces.

The invention will be more fully understood by referring to the following detailed specification and claims taken in connection with the appended drawings.

DETAILED DESCRIPTION OF THE PREFERRED EMBODIMENT

Figure 1:
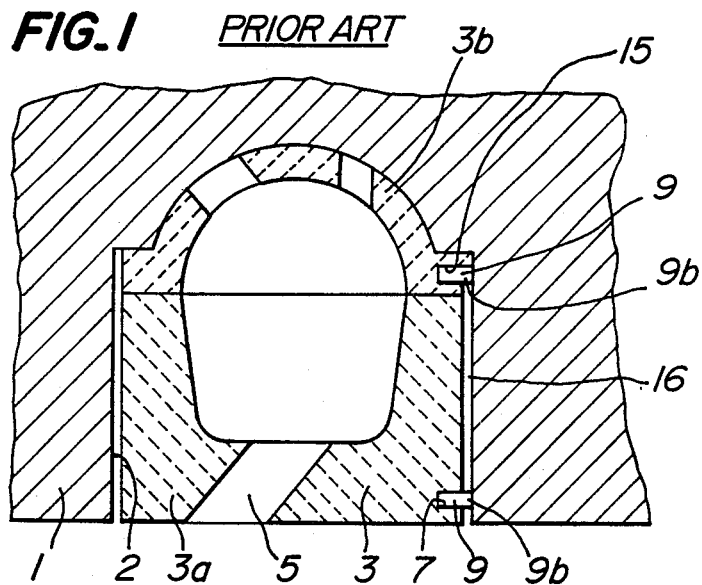
FIG. 1 is a sectional view of a precombustion chamber construction of the prior art.
Figure 2:
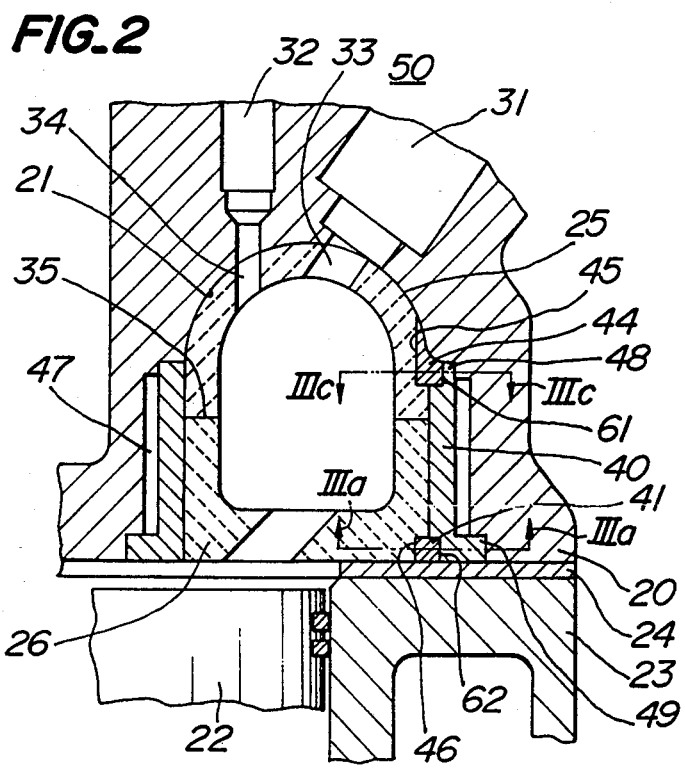
FIG. 2 is a sectional view of a precombustion chamber construction of one embodiment of the invention.

FIG. 2 illustrates a precombustion chamber construction 50 arranged in a precombustion chamber construction receiving cavity 21 formed in a cylinder head 20. A piston 22 is accommodated in a cylinder block 23 having a gasket 24 between it and the cylinder head 20.

The precombustion chamber construction 50 comprises an upper ceramic body 25, a lower ceramic body 26 abutting against it, a metal ring member 40 fitted on both the upper and lower ceramic bodies 25 and 26, a first key member 44 inserted in a key way consisting of a cut-away portion 45 formed in the upper ceramic body 25 and a groove 61 formed in the metal ring member 40, and a second key member 41 inserted in a key way consisting of a cut-away portion 46 formed in the lower ceramic body 26 and a groove 62 formed in the metal ring member 40.

A reference numeral 47 denotes a thermal insulating air layer formed between the precombustion chamber construction receiving cavity 21 and the metal ring member 40. The thermal insulating air layer 47 is sealed by an upper end 48 and a lower end 49 of the metal ring member 40 by press-fitting the precombustion chamber construction 50 into the cylinder head 20.

Such a press-fitting of the precombustion chamber construction into the cylinder head will prevent the ring 40 and the cylinder head 20 from rotatively moving relative to each other. In order to more insure the prevention of the relative movement, however, a knock ball which is known per se may be interposed in a knock ball receiving recess 81 formed in the metal ring member 40 and a knock ball engaging recess 82 formed in the cylinder head 20 at its lower surface contacting the gasket 24.

The cylinder head 20 is formed with a fuel injection nozzle receiving portion 31 and a glow-plug receiving portion 32, respectively, which communicate with a precombustion chamber 28 through apertures 33 and 34 formed in the upper ceramic body.

The engagement of the ceramic bodies with the ring member will be explained by referring to FIGS. 3a, 3b, 3c and 3d, hereinafter. In the embodiment shown in FIG. 3a, a lower ceramic body 26 is formed in its outer periphery at a bottom with a cut-away portion 46 for receiving part of a second key 41 in order to engage the ring member 40 with the lower ceramic body 26. The cut-away portion 46 is in the form of a half-moon which is less than a semicircle and has a straight chord. The cut-away portion 46 may be previously formed in the lower ceramic body 26 or may be formed after the ring member 40 is fitted thereon. Moreover, the remaining portion of the second key member 41 is received in a channel-shaped groove 62 previously formed in the ring member 40.

The dimension of the groove 62 is only required to meet the dimension of the second key member 41, particularly its width. Therefore, the operation of inserting the second key member 41 can be easily effected.

Figure 3A:
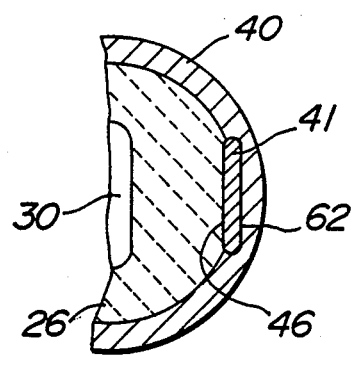
FIG. 3a is a sectional view taken along the line IIIa—IIIa in FIG. 2.
Figure 3B:
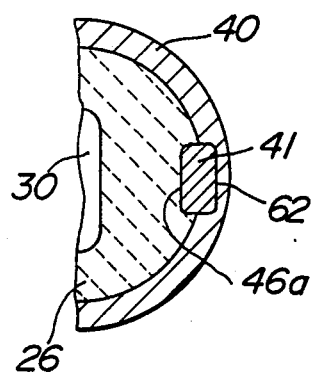
FIG. 3b is a partial sectional view illustrating another embodiment of the invention.

In the embodiment shown in FIG. 3b, instead of the cut-away portion 46 of the semicircle having the straight chord, a channel-shaped groove 46a similar to a groove 62 formed in a ring member 40 is formed in the outer periphery of a lower ceramic body 26 at its bottom. The channel shaped grooves 46a and 62 receive a second key member 41.

Figure 3C:
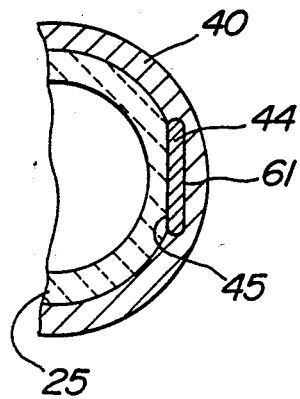
FIG. 3c is a sectional view taken along the line IIIc—IIIc in FIG. 2.

In the embodiment shown in FIG. 3c, an upper ceramic body 25 is formed with a cut-away portion 45 in its outer periphery corresponding to an end face of a ring member for receiving part of a first key member in order to engage the ring member 40 with the upper ceramic body 25. The cut-away portion 45 is in the form of a half-moon which is less than a semicircle and has a straight chord. The cut-away portion 45 may be previously formed in the upper ceramic body 25 or may be formed often the ring member 40 is fitted thereon. Moreover, the remaining portion of the first key member 44 is received in a groove 61 previously formed in the ring member 40.

The dimension of the groove 61 is only required to meet the dimension of the first key member 44, particularly its width. Accordingly, the operation of inserting the first key member 44 can be easily effected.

The first and second key members 44 and 41 may be fixed by press-fitting, thermal contraction or an adhesive. In this manner, the ring member 40 is integrally fixed to the upper ceramic body 25.

Figure 3D:
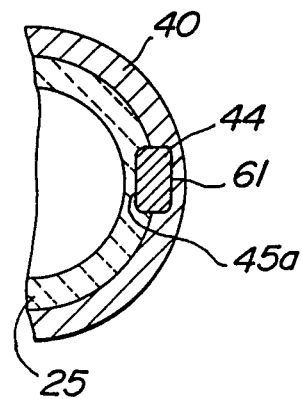
FIG. 3d is a sectional view illustrating a further embodiment of the invention.
Figure 4:
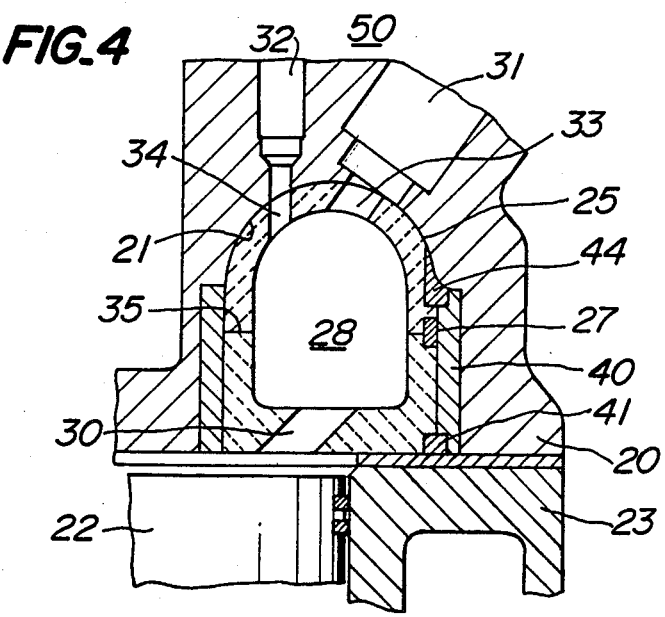
FIG. 4 is a sectional view illustrating one embodiment together with a cylinder head.
Figure 5:
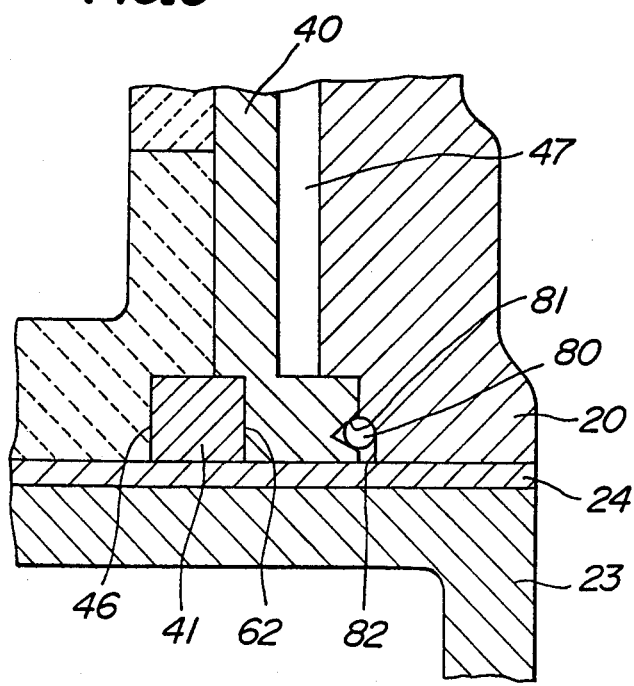
FIG. 5 is a sectional view illustrating a further embodiment of the invention.

In the embodiment shown in FIG. 3d, instead of the cut-away portion 45 of the semicircle having the straight chord, a channel shaped groove 45a similar to a groove 61 formed in a ring member 40. A key member 44 is received in the groove-shaped cut-away portion 45a and the groove 61.

Although the first and second key members 44 and 41 are arranged aligned with each other in FIG. 2, the invention is not limited to such an alignment of the keys. Moreover, although the first and second key members are shown to have square cross-sections, the invention is not limited to such figures. The key members may have a disc-like or elliptical cross-section.

It is preferable to form the cut-away portion in the ceramic body 25 or 26 in the form of the half-moon as shown at 45 or 46 in FIG. 3a or 3c, because the working of the ceramic body is easy. In case of the channel-shaped groove 45a or 46a as shown in FIG. 3b or 3d, moreover, the working of the ceramic body is more difficult than that of the half-moon cut-away portion, but is more effective to prevent the relative rotative movement of the ceramic bodies.

In this manner, the ring member 40 can be integrally fixed to the lower ceramic body 26. Although various kinds of metals can be used for the ring member 40, a heat-resistant metal is preferable in view of the used condition. Furthermore, it is preferable to make the first and second key members 44 and 41 by a metal or ceramic material whose thermal expansion coefficient is equal or substantially equal to that of the ring member 40.

Although the ceramic bodies fixed to the ring members by means of the key members have been explained, the ceramic bodies 25 and 26 may be prevented from rotating relative to each other by a third key member 27 received in cut-away portions formed in the upper and lower ceramic bodies 25 and 26 at their abutting surfaces 35.

The upper and lower ceramic bodies are made of $Si_3N_4$, $SiC$, $ZrO_2$, $Al_2O_3$, glass ceramics, mullite or the like. Moreover, the key members are preferably made of one of these ceramic materials or a metal having a thermal expansion coefficient substantially equal to that of the ceramic material of the upper and lower ceramic bodies. However, the invention is not limited to such a material, and the key members may be made of a metal having a thermal expansion coefficient larger than that of the ceramic bodies, so long as the cut-away portions and grooves are made larger than the key members so as to prevent the upper and lower ceramic bodies from being cracked by the thermal expansion of the key members.

As the metal ring member is fitted on and keyed at its ends to the upper and lower ceramic bodies forming the precombustion chamber to form a unitary body, any relative rotative movement of the upper and lower ceramic bodies about their axes is prevented, even if they are subjected to rotating forces caused by explosions of a fuel and vibrations of an engine. Moreover, as the metal ring has the thermal expansion coefficient substantially equal to that of the cylinder head, holding force of the cylinder head for holding the precombustion chamber is not reduced during the operation of the engine. According to the invention, furthermore, the metal ring member can be securely press-fitted in the cylinder head because the key members do not have parts extending from outer surfaces of the ring member which would otherwise obstruct the press-fitting of the ring member. Therefore, the precombustion chamber according to the invention can advantageously solve the problem of the relative rotative movement of the upper and lower ceramic bodies occurring when the holding force of the cylinder head for holding the precombustion chamber is reduced owing to the difference in thermal expansion coefficient between the ceramic material and the metal.

The metal ring member integral with the ceramic bodies according to the invention can form easily an air layer superior in sealing between the metal ring member and the precombustion chamber construction receiving cavity of the cylinder head. Moreover, the integral construction of the metal ring member and the ceramic bodies can substantially completely avoid the damage of the ceramic bodies in assembling them in the cylinder head and in transferring them by collision with each other. As can be seen from the above description, the precombustion chamber of an internal combustion engine according to the invention has a number of advantages.

While the invention has been particularly shown and described with reference to preferred embodiments thereof, it will be understood by those skilled in the art that the foregoing and other changes in form and details can be made therein without departing from the spirit and scope of the invention.

What is claimed is:

1. A precombustion chamber construction of an internal combustion engine, including an upper ceramic body, a lower ceramic body abutting against the upper ceramic body to form a precombustion chamber communicating through an injection hole with a main combustion chamber of the internal combustion engine, and a metal ring member fitted on outer circumferences of said upper and lower ceramic bodies, said precombustion chamber construction comprising a first key member whose part is received in a cut-away portion formed in said outer circumference of said upper ceramic body in the proximity of an upper end of said metal ring member and whose remaining part is received in a groove formed in an inner circumference of the upper end of the metal ring member corresponding to said cut-away portion of the upper ceramic body, and a second key member whose part is received in a cut-away portion formed in the outer circumference of the lower ceramic body in the proximity of a lower end of the metal ring member and whose remaining part is received in a groove formed in an inner circumference of the lower end of the metal ring member corresponding to the cut-away portion of the lower ceramic body.

2. A precombustion chamber construction as set forth in claim 1, wherein said outer circumferences of the upper and lower ceramic bodies are cut-off in a form of a half-moon which is less than a semicircle and has a straight chord to form the cut-away portions formed in the upper and lower ceramic bodies.

3. A precombustion chamber construction as set forth in claim 1, wherein said cut-away portions formed in said upper and lower ceramic bodies are channel-shaped grooves.

4. A precombustion chamber construction as set forth in claim 1, wherein said precombustion chamber construction further comprises a third key member received in cut-away portions formed in said upper and lower ceramic bodies at their abutting surfaces.

5. A precombustion chamber construction as set forth in claim 1, wherein said key members are made of a metal having a thermal expansion coefficient substantially equal to that of said metal ring member.

* * * * *